(12) United States Patent
Nagamizu et al.

(10) Patent No.: US 8,141,501 B2
(45) Date of Patent: Mar. 27, 2012

(54) METHOD AND FACILITY FOR DISPOSING WET SLUDGE

(75) Inventors: Koji Nagamizu, Tokyo (JP); Akihisa Koga, Tokyo (JP); Hiroyuki Terunuma, Tokyo (JP); Yusuke Nakai, Tokyo (JP); Koyuru Horiike, Tokyo (JP); Masafumi Ito, Tokyo (JP)

(73) Assignee: Mitsubishi Materials Corporation, Tokyo (JP)

( * ) Notice: Subject to any disclaimer, the term of this patent is extended or adjusted under 35 U.S.C. 154(b) by 685 days.

(21) Appl. No.: 11/990,983

(22) PCT Filed: Aug. 26, 2005

(86) PCT No.: PCT/JP2005/015531
§ 371 (c)(1),
(2), (4) Date: Mar. 12, 2009

(87) PCT Pub. No.: WO2007/023561
PCT Pub. Date: Mar. 1, 2007

(65) Prior Publication Data
US 2010/0132592 A1    Jun. 3, 2010

(51) Int. Cl.
*F23G 7/04* (2006.01)
*F23K 3/14* (2006.01)
*F23K 3/16* (2006.01)
*C04B 7/45* (2006.01)
*C04B 11/036* (2006.01)
*B05B 3/04* (2006.01)
*B05B 3/16* (2006.01)

(52) U.S. Cl. ......... 110/238; 106/745; 110/110; 239/381

(58) Field of Classification Search ............... 239/416.4
See application file for complete search history.

(56) References Cited

U.S. PATENT DOCUMENTS 4,510,958 A * 4/1985 Coursen .................. 137/13
5,361,797 A * 11/1994 Crow et al. ............. 137/101.19

FOREIGN PATENT DOCUMENTS

| JP | 61-68168 | | 5/1986 |
|---|---|---|---|
| JP | 63-96400 | | 4/1988 |
| JP | 1-105100 | | 4/1989 |
| JP | 8-276199 | | 10/1996 |
| JP | 11130487 A | * | 5/1999 |
| JP | 11-130487 | * | 12/1999 |
| JP | 3246509 | | 11/2001 |
| JP | 3344448 | | 8/2002 |

OTHER PUBLICATIONS

Weston, Edmund B. "Tables Showing Loss of Head due to Friction of Water in Pipes". D. Van Nostrand Company. Second Edition, pp. 39-49. 1898 [Retrieved on Jun. 14, 2011]. Retrieved from [http://books.google.com/books?id=CDgKAAAAIAAJ&oe=UTF-8].*
International Search Report issued Oct. 25, 2005 in International (PCT) Application PCT/JP2005/015531.

* cited by examiner

*Primary Examiner* — Anthony J Green
*Assistant Examiner* — Karam Hijji
(74) *Attorney, Agent, or Firm* — Wenderoth, Lind & Ponack, L.L.P.

(57) ABSTRACT

A wet sludge disposal facility is capable of smoothly transferring wet sludge to a kiln inlet part of a dry process kiln by a low feeding pressure and without substantially increasing the moisture content in the wet sludge. The disposal facility is used in a cement clinker manufacturing facility having a preheater for preheating a cement raw material, and a dry process kiln connected to the preheater at the kiln inlet part of the dry process kiln. Wet sludge is transferred to the side of the kiln inlet part by feeding water between the wet sludge and the inner wall surface of the pipe by a water injection apparatus in at least one place between the pressure feed pump and the kiln inlet part.

7 Claims, 3 Drawing Sheets

METHOD AND FACILITY FOR DISPOSING WET SLUDGE

BACKGROUND OF THE INVENTION (1) Field of the Invention

The present invention relates to a wet sludge disposal method and facility for efficiently performing final disposal of wet sludge, such as sewage sludge, in a cement clinker manufacturing facility.

(2) Description of Related Art

In disposing of wet sludge, such as sewage sludge, discharged from a sewage disposal plant, the conventional reclamation disposal and ocean disposal have become difficult because of the depletion of disposal sites and the restrictions for preventing environmental pollution in recent years. For this reason, there has been proposed a method for incinerating the wet sludge in an incinerator. However, for example, even the sewage sludge which is formed into a dehydrated cake in the sewage disposal plant contains about 80% moisture.

Therefore, in the disposal method using the incinerator, it is necessary to dry the wet sludge beforehand in order to reduce the thermal load of the incinerator. This results in a problem that the disposal method is inferior in cost effectiveness because additional costs, such as the cost for drying the wet sludge, and the cost for deodorizing exhaust gas generated during the drying treatment are required in addition to the cost originally required for the incineration.

Thus, in order to solve the above described problem, the present applicants have previously proposed, as Japanese Patent No. 3246509 (Patent Document 1) and Japanese Patent No. 3344448 (Patent Document 2), a wet sludge disposal facility and method, in which a cement clinker manufacturing facility is utilized.

Here, the patented invention according to Japanese Patent No. 3246509 is a wet sludge disposal facility, which is installed in combination with a cement clinker manufacturing facility, and which includes a preheater for preheating a cement raw material crushed by a raw-material mill, and a dry process kiln connected to the preheater at the kiln inlet part of the dry process kiln, for calcining the preheated cement raw material. The wet sludge disposal facility is characterized by including: a sludge tank for storing wet sludge; a pressure feed pump for pressure-feeding the wet sludge in the sludge tank; and a pipe connected to the pressure feed pump and configured to directly charge the wet sludge into the dry process kiln, and is characterized in that the pipe is connected to the kiln inlet part or a calcining furnace.

Further, the patented invention according to Japanese Patent No. 3344448 relates to a sludge disposal method characterized in that the wet sludge, while being held in a wet slurry state as it is, is directly charged into the kiln inlet part or the calcining furnace of the dry process kiln which manufactures cement clinker by calcining the cement raw material, by a pump through a pipe, so as to be incinerated.

In the above described wet sludge disposal facility and method, the wet sludge, such as sewage sludge, is directly charged into the existing dry process kiln and incinerated in a high temperature atmosphere of 800° C. to 1200° C., without applying pretreatment such as drying treatment and additive adding treatment, and also without a problem of environmental pollution. Thereby, the final treatment of the wet sludge can be efficiently performed at low cost, and the sludge incineration ash can be economically reused as cement clinker. Further, since the wet sludge is pressure-fed through the pipe so as to be directly incinerated, it is also possible to obtain an effect of preventing a malodor problem and the like.

Meanwhile, for example, when sewage sludge is disposed in the above described disposal method and facility, the sewage sludge whose excess moisture is usually removed is formed into a dehydrated cake having a moisture content of around 80% in the sewage disposal plant mainly for convenience of transportation, and is then transported to the cement manufacturing plant. Here, the dehydrated cake having the moisture content of around 80% has hardness and fluidity equivalent to those of, so to speak, a wet porous clay. For this reason, a pressure feed pump, such as a screw type pump and a piston type pump, capable of obtaining high discharge pressure is used as the pump for pressure-feeding the sewage sludge to the kiln inlet part, or the like, of the dry process kiln.

On the other hand, in general, in the cement manufacturing facility, a plurality of dry process kilns having a diameter of 4 to 6 m and a length of around 80 m are installed in a broad site, and a preheater having a height of several tens of meters is installed in the kiln inlet part of the dry process kiln. For this reason, the pipe from the sludge tank for storing the wet sludge to the kiln inlet part of the dry process kiln needs to have a length of about 150 to 250 m, and further to have a rising part of 10 to 15 m from the ground level to the kiln inlet part.

As a result, in order to finally secure an extrusion pressure enough to charge the sewage sludge into the kiln inlet part, or the like, at the distal end of the pipe, the pressure at the discharge side of the pressure feed pump needs to be increased to about 90 kg/cm$^2$, which results in a problem that the facility cost is increased because the piping system needs to satisfy a very high withstand pressure specification.

Thus, it is conceivable that the viscosity of the sewage sludge is lowered by feeding water to the sludge tank in which the sewage sludge is received, and thereby the fluidization of the sewage sludge is promoted. However, there is a problem that the heat consumption in the dry process kiln is increased as a result of the increase in the moisture content of the sewage sludge, and thereby the fuel cost is increased so as to lower the economic efficiency.

In addition, simply by adding only water to the sludge tank, only the water is accumulated in the bottom part of the sludge tank so as to be fed, as it is, to the pipe from the pressure feed pump. For this reason, there is a disadvantage that the facility costs and pretreatment costs are also increased because a large-scale stirring apparatus for separately mixing the sewage sludge and the water needs to be additionally provided, and further a measure against malodor generated during the mixing treatment is needed.

Patent Document 1: Japanese Patent No. 3246509
Patent Document 2: Japanese Patent No. 3344448

BRIEF SUMMARY OF THE INVENTION

The present invention has been made in view of the above described circumstance. An object of the invention is to provide a wet sludge disposal method and facility which are capable of smoothly transferring wet sludge to a kiln inlet part, or the like, of a dry process kiln by a low feeding pressure without substantially increasing the moisture content in the wet sludge.

To this end, a first aspect of the present invention is characterized, in a cement clinker manufacturing facility having a preheater for preheating a cement raw material, and a dry process kiln connected to the preheater at a kiln inlet part of the dry process kiln and configured to calcinate the preheated cement raw material, in that when wet sludge stored in a sludge tank is transferred through a pipe by a pressure feed pump and is directly charged into a lower part of the preheater to thereby be incinerated, water is intermittently or continuously fed between the wet sludge and the inner wall surface of the pipe, in at least one place of the pipe between the pressure feed pump and the lower part of the preheater.

In this case, a second aspect of the present invention is characterized in that the lower part of the preheater according to the first aspect is the kiln inlet part or a calcining furnace provided in a preceding stage of the kiln inlet part.

Further, a third aspect of the present invention is characterized, in one of the first aspect and the second aspect, in that the wet sludge has a moisture content of 90% or less.

Then, a fourth aspect of the present invention is a wet sludge disposal facility for directly incinerating wet sludge in a cement clinker manufacturing facility which has a preheater for preheating a cement raw material, and a dry process kiln connected to the preheater at a kiln inlet part of the dry process kiln and configured to calcinate the preheated cement raw material, the wet sludge disposal facility being characterized by including: a sludge tank configured to store the wet sludge; a pressure feed pump configured to pressure-feed the sludge in the sludge tank; a pipe connected to the discharge side of the pressure feed pump and configured to directly charge the wet sludge into a lower part of the preheater; and a water injection apparatus provided at least one place of the pipe between the pressure feed pump and the lower part of the preheater and configured to intermittently or continuously feed water between the wet sludge and the inner wall surface of the pipe.

Further, a fifth aspect of the present invention is characterized in that the water injection apparatus according to the fourth aspect includes: an annular gap part which is circumferentially formed in an intermediate part in the thickness direction of the pipe; a water feed line in which a water feed pump for feeding water to the gap part is inserted; and a nozzle part which has one end communicating with the gap part and the other end opened over the entire periphery of the inner wall surface of the pipe, and which thereby feeds the water between the wet sludge and the inner wall surface of the pipe through the gap part.

Here, a sixth aspect of the present invention is characterized in that the water injection apparatus according to the fifth aspect further includes: a pressure detector configured to detect a pressure in the pipe in the upstream side or the downstream side of the water injection apparatus; and control means configured, when the pressure detected by the pressure detector reaches a first set value, to start the water feed pump, and configured, when the pressure detected by the pressure detector reaches a second set value, to stop the water feed pump.

Further, a seventh aspect of the present invention is characterized, in any of the fourth to sixth aspects, in that the inside diameter of the pipe is expanded in the downstream side of the water injection apparatus.

Further, an eighth aspect of the present invention is characterized in that the sludge tank according to the fourth to seventh aspects stores sewage sludge having a moisture content of 90% or less.

In the wet sludge disposal method according to any of the first to third aspects and the wet sludge disposal facility according to any of the fourth to eighth aspects, when the wet sludge is pressure-fed by the pressure feed pump through the pipe to the lower part of the preheater into which part the wet sludge is to be charged, the surface of the wet sludge is wetted by intermittently or continuously feeding water between the wet sludge and the inner wall surface of the pipe by the water injection apparatus in the middle of the pipe. As a result, the friction between the wet sludge and the inner wall surface of the pipe is reduced, and the sliding of the wet sludge is promoted. Thereby, even in the case where the length of the pipe is increased, it is possible to smoothly transfer the wet sludge to the lower part of the preheater by a low discharge pressure of the pressure feed pump.

In this case, since only a part near the wet sludge surface in contact with the inner wall surface of the pipe is wetted by the water, the moisture content of the wet sludge is not substantially increased, and hence also the heat consumption in the dry process kiln is not increased.

Therefore, in particular, as in one of the third aspect and the eighth aspect, when the wet sludge disposal method and facility are applied to the disposal of wet sludge having a moisture content of 90% or less, significant effects can be obtained.

Further, according to the fifth aspect of the present invention, when water is fed to the annular gap part formed in the intermediate part in the thickness direction of the pipe by the water feed pump, the water is fed over the entire periphery of the inner wall surface of the pipe from the gap part through the nozzle part. Thereby, the entire periphery of the wet sludge can be effectively wetted by a smaller amount of water, which enables the wet sludge to be smoothly slid.

Further, according to the sixth aspect of the present invention, when the detection signal from the pressure detector indicates that the pressure in the pipe has reached the first set value, the water feed pump can be first started to feed water, and when the pressure in the pipe is lowered to the second set value due to the water feed operation, the water feed pump can be stopped. As a result, even when the moisture content of the wet sludge to be disposed is changed, the wet sludge can be pressure-fed smoothly by a low pressure in correspondence with the change in the moisture content of the wet sludge, and the pressure in the pipe can also be kept within a predetermined range by a minimum feed amount of water.

Further, according to the seventh aspect of the present invention, the inside diameter of the pipe is expanded in the downstream side of the water injection apparatus, and thereby the pressure required to feed the wet sludge in the downstream side is further reduced, so that the discharge pressure required of the pressure feed pump can be suppressed to be low.

DESCRIPTION OF SYMBOLS

Figure 1:
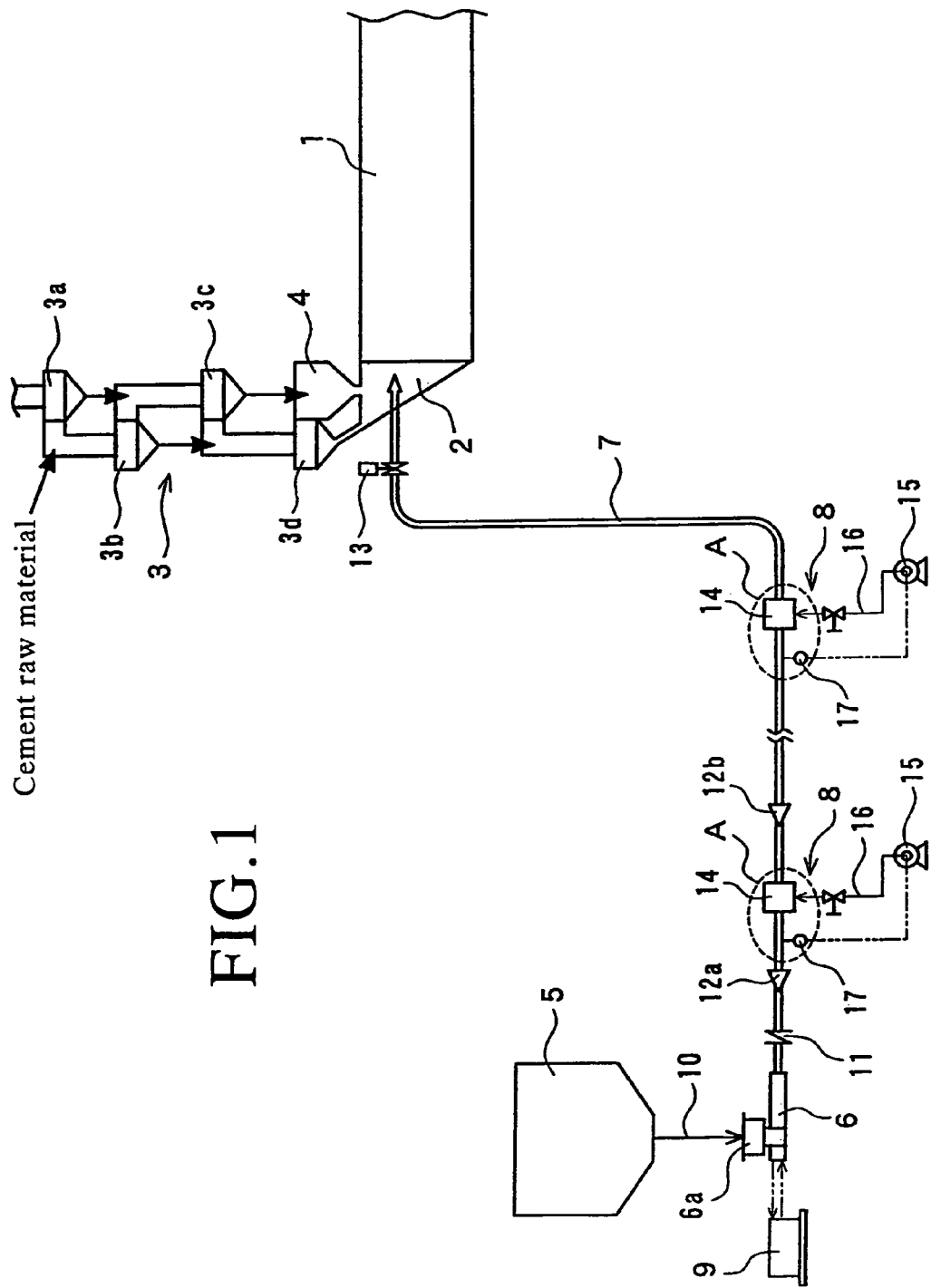
FIG. 1 is a schematic representation showing an embodiment of a wet sludge disposal facility according to the present invention.

1 Dry process kiln
2 Kiln inlet part
3 Preheater
4 Calcining furnace
5 Sludge tank
6 Pressure feed pump
7 Pipe
8 Water injection apparatus
12$a$, 12$b$ Expanded diameter pipe
14 Water injector
15 Water feed pump
16 Water feed line
17 Pressure detector 21 Gap part
22 Nozzle part
22a Distal end of nozzle part

DETAILED DESCRIPTION OF THE INVENTION

Figure 2:
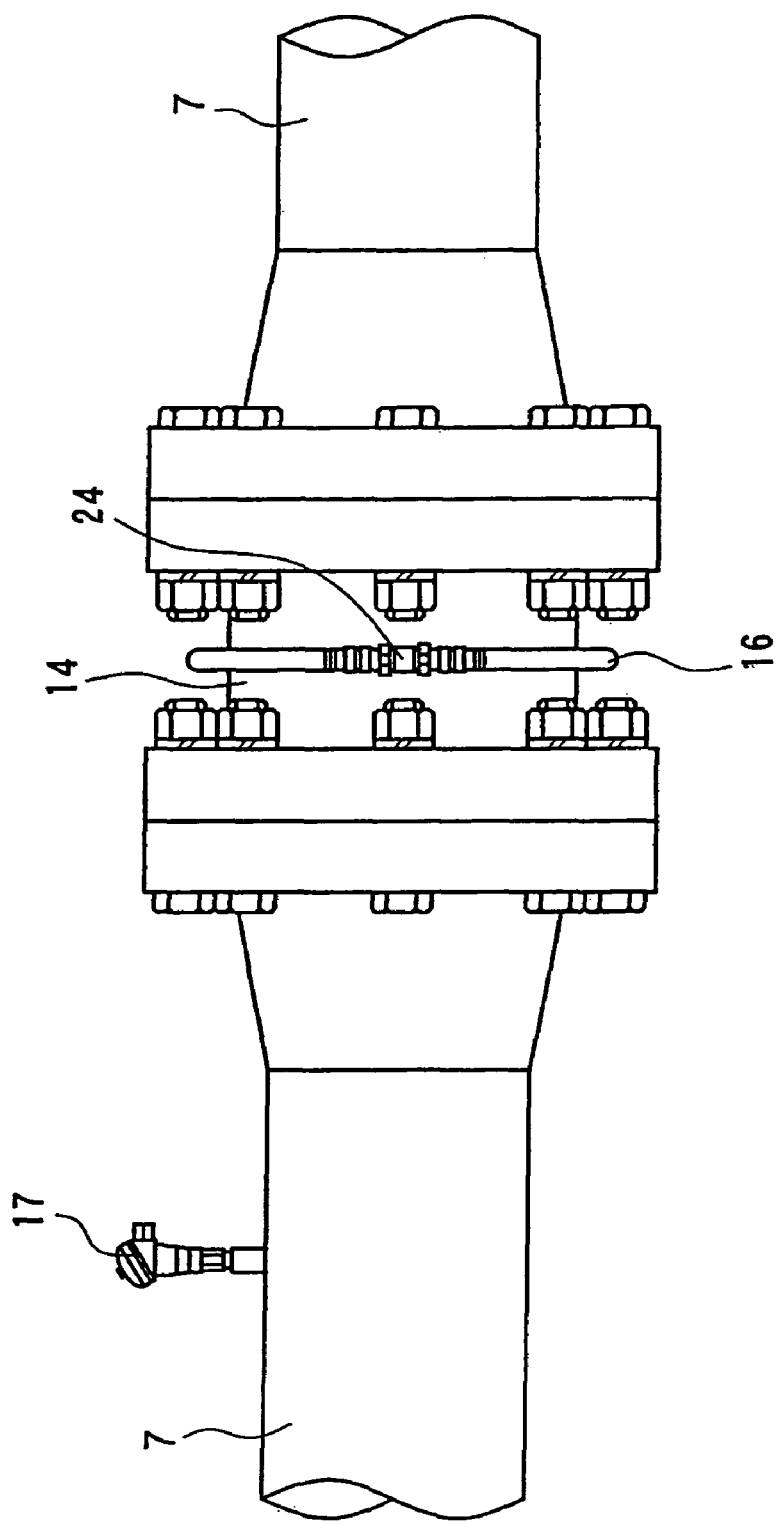
FIG. 2 is an enlarged view of the part A in FIG. 1.
Figure 3:
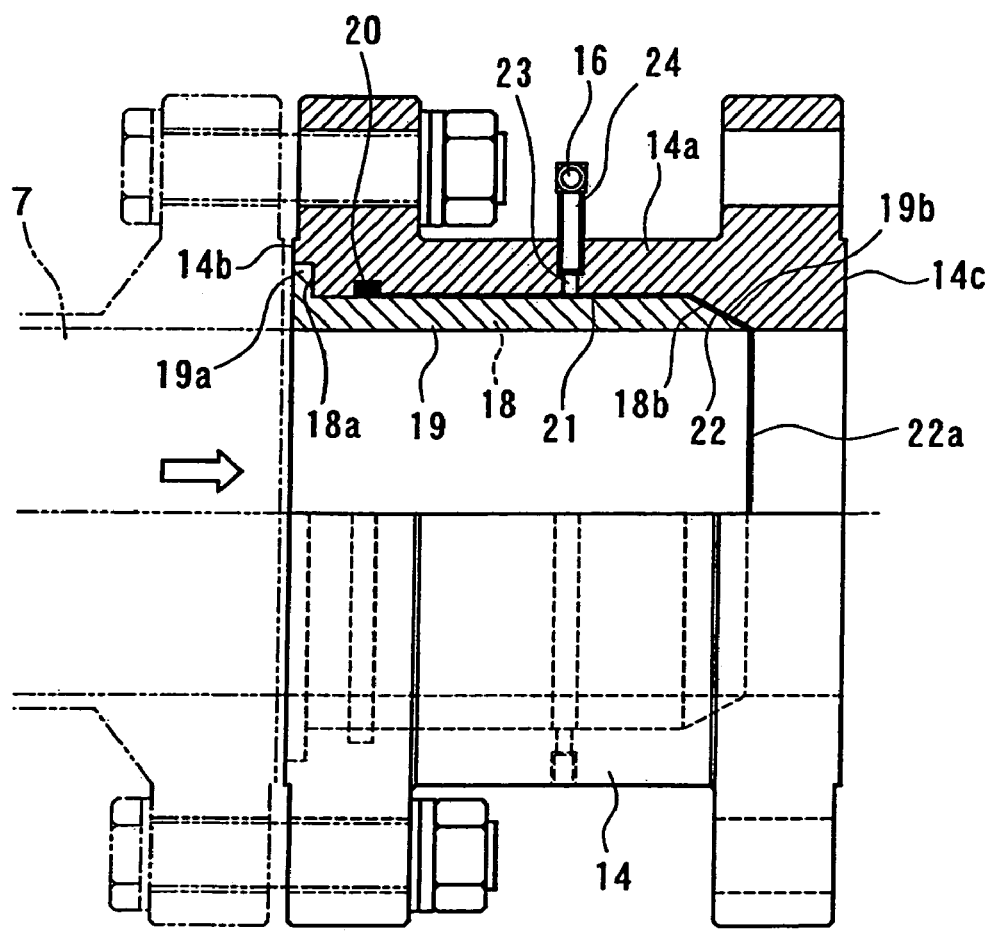
FIG. 3 is a longitudinal sectional view of a main part of FIG. 2.

FIG. 1 to FIG. 3 show an embodiment in which a wet sludge disposal facility according to the present invention is applied to a sewage sludge disposal facility installed in combination with a cement clinker manufacturing facility. Reference numeral 1 in FIG. 1 denotes a dry process kiln for calcining a cement raw material in the cement manufacturing facility.

The dry process kiln 1 is a rotary kiln which is rotatably provided around a shaft center. A preheater 3 for preheating the cement raw material is provided in a kiln inlet part 2 on the left side of the dry process kiln 1 in FIG. 1. In the kiln front part on the right side in FIG. 1, there is provided a main burner (not shown) for heating the inside of the dry process kiln.

Here, the preheater 3 is configured by a plurality of stages (four stages in the figure) of cyclones 3a to 3d arranged in series in the vertical direction, and the cement raw material is fed to the first stage cyclone 3a. Further, in a lower end part between the third stage cyclone 3c and the fourth stage cyclone 3d, combustion exhaust gas is introduced from the kiln inlet part 2 of the dry process kiln 1. In the lower end part, there is also provided a calcining furnace 4 in which a combustion apparatus of fuel, such as coal, fed from a fuel feed line (not shown) is provided.

Further, the sewage sludge disposal facility is installed in combination with the cement clinker manufacturing facility.

The sewage sludge disposal facility is substantially configured by a sludge tank 5 for storing sewage sludge, a pressure feed pump 6 for pressure-feeding the sludge in the sludge tank 5, a pipe 7 connected to the discharge side of the pressure feed pump 6 and configured to directly feed wet sludge to the kiln inlet part 2 of the dry process kiln 1, and water injection apparatuses 8 provided at two mutually spaced places of the pipe 7 between the pressure feed pump 6 and the kiln inlet part 2.

The pressure feed pump 6 is a piston type pump driven in a reciprocating manner by hydraulic fluid fed from a hydraulic unit 9, and a sludge feed line 10 from the sludge tank 5 is introduced into a feed part 6a of the pressure feed pump 6. The pipe 7 for transferring the sewage sludge is also connected to the discharge side of the pressure feed pump 6 via a check valve 11.

On the discharge side of the pressure feed pump 6, the diameter of the pipe 7 is expanded from a nominal diameter of 150 mm to a nominal diameter of 200 mm by an expanded diameter pipe 12a. Further, between the water injection apparatuses 8, the diameter of the pipe 7 is expanded from a nominal diameter of 200 mm to a nominal diameter of 250 mm by an expanded diameter pipe 12b, and a butterfly valve 13 is inserted in the pipe 7 at a place near the kiln inlet part 2. The water injection apparatuses 8 are provided substantially in the middle of the whole length of the pipe 7 and in the rising part leading to the kiln inlet part 2, respectively.

Each of the water injection apparatuses 8 is configured by a water injector 14 which is inserted in the pipe 7 to form a part of the pipe 7, a water feed line 16 which feeds water to the water injector 14 by a water feed pump 15, a pressure detector 17 which is attached to the pipe 7 near the water injector 14 on the upstream side thereof and detects the pressure in the pipe 7, and a control apparatus (not shown) which, when the pressure detected by the pressure detector 17 reaches a high pressure side set value (first set value), starts the water feed pump 15, and which, when the pressure detected by the pressure detector 17 reaches a low pressure side set value (second set value), stops the water feed pump 15.

Here, the higher pressure side set value and the low pressure side set value of the control apparatus provided on the downstream side of the pipe 7 (the right side in FIG. 1) are set lower than the high pressure side set value and the low pressure side set value of the control apparatus provided on the upstream side of the pipe 7 (the left side in FIG. 1), respectively.

Further, as shown in FIG. 3. the water injector 14 has a recessed part 18 formed by such a manner that the diameter of the inner wall ranging from one end surface 14b to near the other end surface 14c of the main body part 14a of the water injector 14 is expanded to be larger than the inner diameter of the pipe 7. In the recessed part 18, a step 18a is formed by further increasing the diameter of the side of the one end surface 14b, and an inclined part 18b is formed by gradually reducing the diameter of the other end part toward the side of the other end surface 14c.

Also, a cylindrical sleeve 19 is inserted in the recessed part 18 from the side of the one end surface 14b. A flange 19a configured to engage the step 18a of the recessed part 18 is formed in one end of the sleeve 19. A tapered part 19b configured to face the inclined part 18b of the recessed part 18 is formed in the other end of the sleeve 19. Further, a groove is formed near the step 18a of the recessed part 18, and an O-ring 20 for liquid-tightly sealing between the recessed part 18 and the sleeve 19 is provided in the groove.

Further, an annular gap part 21 through which water can flow is formed between the recessed part 18 and the sleeve 19, so as to range from the O-ring 20 to the inclined part 18b. Further, a nozzle part 22 connected to the gap part 21 is formed between the inclined part 18b and the tapered part 19b. The distal end 22a of the nozzle part 22 is also opened over the entire periphery of the inner wall surface of the sleeve 19.

Further, injection holes 23 leading from the outer peripheral surface of the main body part 14a to the gap part 21 are bored at four places spaced at equal intervals in the circumferential direction of the main body part 14a. On the other hand, the distal end part of the water feed line 16 is formed in a ring shape which surrounds the outer periphery of the water injector 14, and injection pipes 24 are provided in a branched manner at the four places in the circumferential direction of the water injector 14. Then, each of the injection pipes 24 is fitted in the injection hole 23.

Next, there will be described an embodiment of a sewage sludge disposal method according to the present invention, in which the sewage sludge disposal facility configured as described above is used.

First, the cement raw material preheated in the preheater 3 and temporarily calcined in the calcining furnace 4 is introduced into the dry process kiln 1 from the kiln inlet part 2 as shown by an arrow in the figure of the drawing. Then, in the process in which the cement raw material gradually fed from the side of the kiln inlet part 2 to the side of the kiln front part in the dry process kiln 1, the cement raw material is calcined to become clinker by being heated to about a temperature ranging from 1000° C. to about 1450° C. by combustion exhaust gas from the main burner.

In parallel with the manufacture of the cement clinker, sewage sludge having a moisture content of about 80% stored beforehand in the sludge tank 5 is directly charged into the kiln inlet part 2 of the dry process kiln 1 through the pipe 7 by the pressure feed pump 6. Then, the moisture of the sewage sludge charged into the kiln inlet part 2 is instantaneously evaporated in a high temperature atmosphere of about 1000° C., and the solid contents of the sewage sludge are introduced into the dry process kiln 1. The solid contents of the sewage sludge are then calcined together with the heated cement raw material so as to become a part of cement clinker, and discharged.

Also, while the sewage sludge is pressure-fed through the pipe 7 by the pressure feed pump 6 to the kiln inlet part 2 into which the sewage sludge is to be charged, the pressure in the pipe 7 is always detected at the place where each of the pressure detectors 17 is attached. When the detected pressure reaches the each high pressure side set value, the water feed pump 15 is started by the control apparatus. Thereby, water is fed to the gap part 21 in the water injector 14 from the water feed line 16. Further, the water is fed over the entire periphery of the inner wall surface of the water injector 14 and between the outer peripheral surface of the sewage sludge and the inner wall surface of the water injector 14 from the distal end 22a of the nozzle part 22. Thereby, the whole surface of the sewage sludge is wetted, so as to reduce the friction between the outer peripheral surface of the sewage sludge and the inner wall surface of the pipe 7, so that the sliding of the sewage sludge on the inner wall surface of the pipe 7 is promoted.

As a result, when the pressure in the pipe 7 is lowered to the each low pressure side set value, the operation of the water feed pump 15 is stopped by the control apparatus.

By repeating the above described water injection operation, it is possible to smoothly transfer the sewage sludge to the kiln inlet part 2 by a low discharge pressure of the pressure feed pump 6, even in the case where the length of the pipe 7 is increased.

In this case, since only a part of the sewage sludge near the surface thereof is wetted by the fed water, the moisture content of the sewage sludge is not substantially increased. As a result, also the heat consumption in the dry process kiln 1 is not increased.

In particular, since the water fed to the annular gap part 21 in the water injector 14 is fed over the entire periphery of the inner wall from the distal end 22a of the nozzle part 22, the entire periphery of the sewage sludge can be effectively wetted by a small amount of water, and thereby the sliding of the sewage sludge can be made smoother.

Further, when the detection signal from the pressure detector 17 indicates that the pressure in the pipe 7 has reached the high pressure side set value, the water feed pump 15 is first started to feed water. When the pressure in the pipe 7 is lowered to the low pressure set value, the water feed pump 15 is stopped. Thus, even in the case where the moisture content of the sewage sludge is changed, it is possible to smoothly pressure-feed the sewage sludge by a low pressure in correspondence with the change in the moisture content of the sewage sludge, and also possible to hold the pressure in the pipe 7 within a predetermined range by a minimum water feed amount.

In addition, since the inner diameter of the pipe 7 is expanded between the water injection apparatuses 8 provided at the two places, it is possible to further reduce the pressure required for feeding the sewage sludge on the downstream side of the pipe 7, so that the discharge pressure required of the pressure feed pump 6 can be suppressed to a lower value.

Note that in the above described embodiment, only a case where the sewage sludge is disposed in a cement clinker manufacturing facility is described, but the present invention is not limited to this. It is also possible to similarly dispose the other various kinds of wet sludge.

Further, the place into which the wet sludge is charged is not limited to the kiln inlet part. The wet sludge may also be charged into the lower part of the other preheater 3 of the calcining furnace 4, or the like.

INDUSTRIAL APPLICABILITY

According to the present invention, it is possible to provide a wet sludge disposal method and facility capable of smoothly transferring wet sludge to a kiln inlet part, or the like, of a dry process kiln, without significantly increasing the moisture content of the wet sludge, and by a low feed pressure.

The invention claimed is:

1. A wet sludge disposal facility for directly incinerating wet sludge in a cement clinker manufacturing facility which has a preheater for preheating a cement raw material, and a dry process kiln connected to the preheater at a kiln inlet part of the dry process kiln and configured to calcine the preheated cement raw material, the wet sludge disposal facility comprising:
   a sludge tank configured to store the wet sludge;
   a pressure feed pump configured to pressure-feed the sludge in the sludge tank;
   a pipe connected to the discharge side of the pressure feed pump and configured to directly charge the wet sludge into a lower part of the preheater; and
   a plurality of water injection apparatuses provided to the pipe for intermittently or continuously feeding water between the wet sludge and the inner wall surface of the pipe,
   wherein the water injection apparatuses are provided respectively at a middle portion between the pressure feeding pump and the lower part of the preheater and at a rising part leading to the kiln inlet part of the pipe,
   wherein each of the water injection apparatuses includes
   (i) a water injector,
   (ii) a water feed pump,
   (iii) a pressure detector disposed upstream of the water injector for detecting the pressure in the pipe, and
   (iv) a control apparatus which starts the water feed pump when the pressure detected by the pressure detector reaches a first set value and stops the water feed pump when the pressure detected by the pressure detector reaches a second set value, the first set value being higher than the second set value;;
   wherein the first value and the second set value of the control apparatus of the water injection apparatus on the downstream side of the pipe are set lower than the first set value and the second set value of the control apparatus of the water injection apparatus on the upstream side of the pipe.

2. The wet sludge disposal facility according to claim 1, wherein each of the water injectors comprises:
   an annular gap part which is circumferentially formed in an intermediate part in the thickness direction of the pipe;
   a water feed line in which the respective water feed pump for feeding water to the gap part is inserted; and
   a nozzle part which has one end communicating with the gap part and the other end opened over the entire periphery of the inner wall surface of the pipe, and which feeds the water between the wet sludge and the inner wall surface of the pipe through the gap part.

3. The wet sludge disposal facility according to claim 1, wherein the inside diameter of the pipe is expanded in the downstream side of the water injection apparatus.

4. The wet sludge disposal facility according to claim 1, wherein the sludge tank stores sewage sludge having a moisture content of 90% or less.

5. The wet sludge disposal facility according to claim 2, wherein the inside diameter of the pipe is expanded in the downstream side of the water injection apparatus.

6. The wet sludge disposal facility according to claim 1, wherein each water injector feeds water between the wet sludge and the inner wall surface of the pipe around an entire periphery of the inner wall surface of the pipe.

7. The wet sludge disposal facility according to claim 1, wherein each water injector feeds water between the wet sludge and the inner wall surface of the pipe.

* * * * *